(12) United States Patent
Bonville (10) Patent No.: US 6,248,462 B1
(45) Date of Patent: Jun. 19, 2001

(54) METHOD AND APPARATUS FOR THERMAL MANAGEMENT OF A FUEL CELL ASSEMBLY

(75) Inventor: Leonard J. Bonville, Marlborough, CT (US)

(73) Assignee: International Fuel Cells, LLC, South Windsor, CT (US)

(*) Notice: Subject to any disclaimer, the term of this patent is extended or adjusted under 35 U.S.C. 154(b) by 0 days.

(21) Appl. No.: 09/322,733

(22) Filed: May 28, 1999

(51) Int. Cl.[7] ........................................... H01M 8/04
(52) U.S. Cl. ................... 429/24; 429/26; 429/13; 429/22
(58) Field of Search ................ 429/24–26, 13–22

(56) References Cited

U.S. PATENT DOCUMENTS 4,500,612 * 2/1985 Fujii et al. ..................... 429/26
5,965,288 * 10/1999 Okamoto ........................ 429/26

* cited by examiner

Primary Examiner—Mark F. Huff
Assistant Examiner—Daborah Chacko-Davis
(74) Attorney, Agent, or Firm—McCormick, Paulding & Huber LLP (57) ABSTRACT

An apparatus for the thermal management of an electrochemical fuel cell assembly, wherein a plurality of thermal management loops in contact with the fuel cell assembly are utilized to maintain the fuel cell assembly above freezing or, alternatively, raise the fuel cell assembly above freezing.

The thermal management loops are in thermal communication with the fuel cell assembly as well as each other, but are diffusably isolated from one another.

28 Claims, 5 Drawing Sheets

METHOD AND APPARATUS FOR THERMAL MANAGEMENT OF A FUEL CELL ASSEMBLY

FIELD OF THE INVENTION

This invention relates in general to a method and apparatus for the thermal management of a fuel cell assembly during times of harsh environmental conditions, and deals more particularly with a method and apparatus by which a fuel cell assembly may be maintained at temperatures above freezing or, alternatively, raised quickly above freezing.

BACKGROUND OF THE INVENTION

Electrochemical fuel cell assemblies are known for their ability to produce electricity and a subsequent reaction product through the interaction of a fuel being provided to an anode and an oxidant being provided to a cathode, thereby generating a potential between these electrodes. Such fuel cell assemblies are very useful and sought after due to their high efficiency, as compared to internal combustion fuel systems and the like. Fuel cell assemblies are additionally advantageous due to the environmentally friendly chemical reaction by-products that are produced, such as water. In order to control the temperature within the fuel cell assembly, a coolant is provided to circulate about a fuel cell assembly, usually water. This concentration and use of water within fuel cell assemblies makes them particularly sensitive to freezing temperatures.

Electrochemical fuel cell assemblies typically employ hydrogen as the fuel and oxygen as an oxidant where, as noted above, the reaction by-product is water. Such fuel cell assemblies may employ a membrane consisting of a solid polymer electrolyte, or ion exchange membrane, disposed between the two electrodes. The electrodes are usually supported by a porous, electrically conductive sheet material—typically carbon fiber paper. The ion exchange membrane is also known as a proton exchange membrane (hereinafter PEM), such as sold by DuPont under the trade name NAFION™, and usually has a catalyst layer formed thereon to provide a membrane-electrode interface so as to promote the desired electrochemical reaction. The membrane electrode assemblies are then electrically coupled in order to provide a path for conducting electrons between the electrodes when an external load is applied.

In operation, hydrogen fuel permeates the porous electrode support material of the anode and reacts at the catalyst layer to form hydrogen ions and electrons. The hydrogen ions migrate through the membrane to the cathode and the electrons flow through an external circuit to the cathode. At the cathode, the oxygen-containing gas supply also permeates through the porous electrode support material and reacts with the hydrogen ions and the electrons from the anode at the catalyst layer to form the by-product water. Not only does the ion exchange membrane facilitate the migration of these hydrogen ions from the anode to the cathode, but the ion exchange membrane also acts to isolate the hydrogen fuel from the oxygen-containing gas oxidant. The reactions taking place at the anode and cathode catalyst layers are represented by the equations:

Anode reaction: $H_2 \rightarrow 2H^+ + 2e$

Cathode reaction: $\frac{1}{2}O_2 + 2H^+ + 2e \rightarrow H_2O$

Conventional fuels cells may have the ion exchange membrane positioned between two gas-permeable, electrically conductive plates, referred to as the anode and cathode plates. The plates are typically formed from graphite, a graphite composite, or the like. The plates act as a structural support for the two porous, electrically conductive electrodes, as well as serving as current collectors and providing the means for carrying the fuel and oxidant to the anode and cathode, respectively. They are also utilized for carrying away the reactant by-product water during operation of the fuel cell.

When flow channels are formed within these plates for the purposes of circulating either fuel or oxidant in the anode and cathode plates, they are referred to as fluid flow field plates or water transfer plates. When these plates simply overlay channels formed in the anode and cathode porous material, they are referred to as separator plates. The plates may have formed therein reactant feed manifolds which are utilized for supplying fuel to the anode flow channels or, alternatively, oxidant to the cathode flow channels. They also have corresponding exhaust manifolds to direct unreacted components of the fuel and oxidant streams, and any water generated as a by-product, from the fuel cell. Additionally, the fluid flow field plates or water transfer plates may support channels for the purpose of circulating a coolant about the fuel cell, as well as selectively supporting coolant manifolds.

Recent efforts at producing the fuel for fuel cell assemblies have focused on utilizing impure hydrogen produced from the chemical conversion of hydrocarbon fuels, such as methane, natural gas, gasoline or the like, into hydrogen. This process requires that the hydrogen produced must be efficiently converted to be as pure as possible, thereby ensuring that a minimal amount of carbon monoxide and other undesirable chemical byproducts are produced. For PEM type fuel cell assemblies this conversion of hydrocarbons is generally accomplished through the use of a steam reformer, a shift converter and a selective oxidizer in combination.

The catalyst layer in a fuel cell assembly is typically a carbon supported platinum or platinum alloy, although other noble metals or noble metal alloys may be utilized. Multiple electrically connected fuel cell assemblies consisting of two or more anode plate/membrane/cathode plate combinations are referred to as a fuel cell stack. The fuel cells in a fuel cell stack are typically electrically connected in series.

It is necessary to provide some heat exchange system whereby the excess heat generated during the reaction process is extracted so as not to adversely effect the fuel cell operation. As disclosed above, the anode and cathode plates provide coolant channels for the circulation of a water coolant, as well as the wicking and carrying away of excessive water produced as a by-product of the fuel cell assembly operation. The water so collected and circulated through a fuel cell assembly is susceptible to the freezing effects of temperatures below 32° F. (0° C.) and may therefore damage and impair the operation of the fuel cell assembly as the water expands when subjected to such temperatures.

With the forgoing problems and concerns in mind, it is the general object of the present invention to provide for the thermal management of a fuel cell assembly which overcomes the above-described drawbacks, as well as to affirmatively maximize the efficiency of the fuel cell even in times of freezing temperatures.

SUMMARY OF THE INVENTION

It is an object of the present invention to provide a dual thermal management apparatus for a fuel cell assembly.

It is another object of the present invention to provide an effective cooling system for an operational fuel cell assembly while also ensuring that excessive water is transported away.

It is another object of the present invention to provide a thermal management apparatus for maintaining a fuel cell assembly above freezing.

It is another object of the present invention to provide a thermal management apparatus for raising the temperature of a fuel cell assembly above freezing in a rapid fashion.

It is another object of the present invention to provide a thermal management apparatus which can be utilized with a fuel cell assembly having any type of configuration without impeding the operation of the fuel cell assembly or causing any cross contamination.

According to one embodiment of the present invention, a fuel cell stack includes a plurality of electrochemical fuel cell assemblies being in electrical connection with each other. The fuel cell stack is equipped with a thermal management apparatus having a primary thermal management loop and a secondary thermal management loop, both of which are in thermal communication with the fuel cell stack while being diffusably isolated from one another.

The primary thermal management loop circulates a coolant and is in diffusable communication with the fuel cell stack, while the secondary thermal management loop circulates an antifreeze solution and is diffusably isolated from the fuel cell stack. The secondary thermal management loop circulates the antifreeze solution at interspersed locations between the fuel cell assemblies along the fuel cell stack.

These and other objectives of the present invention, and their preferred embodiments, shall become clear by consideration of the specification, claims and drawings taken as a whole.

DETAILED DESCRIPTION OF THE PREFERRED EMBODIMENT

Figure 1:
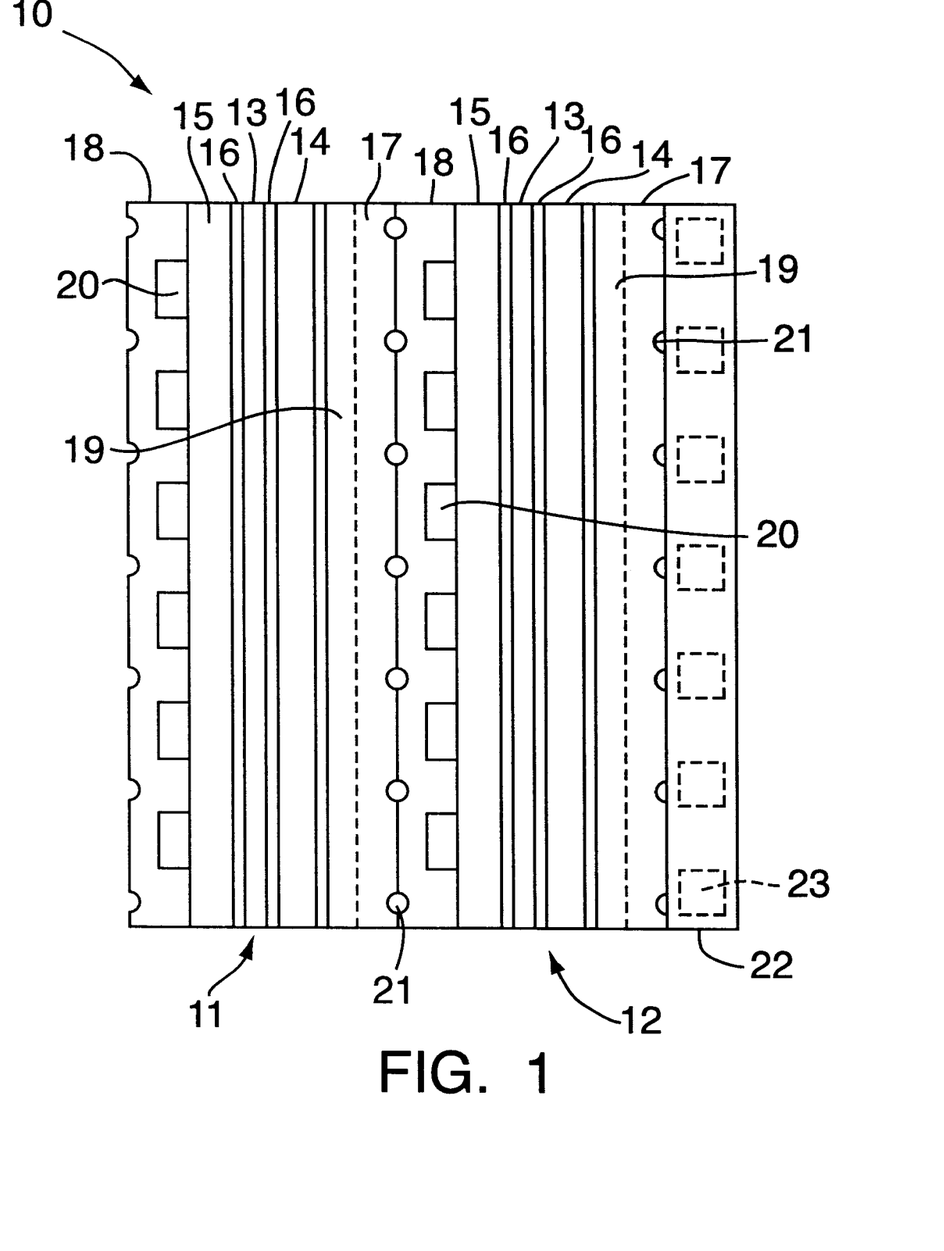
FIG. 1 illustrates a section taken through two PEM fuel cells arranged in series and being in thermal contact with a cooler plate, according to one embodiment of the present invention.

FIG. 1 illustrates a sectional view of a partial fuel cell stack 10, according to one embodiment of the present invention. The partial fuel cell stack 10 has two electrochemical fuel cell assemblies, 11 and 12, arranged in series contact, as well as being in thermal contact with a cooler plate 22. Each fuel cell assembly, 11 and 12, produces approximately 0.6–0.7 V. In order to produce a desired power supply voltage it is necessary for a great many fuel cells to be joined together in series. The fuel cells 11 and 12 each employ an ion exchange membrane 13 consisting of a solid polymer electrolyte disposed between an anode electrode 15 and a cathode electrode support 14. The ion exchange membrane 13 is also referred to as a proton exchange membrane (PEM) and can be a plastic-type film approximately 0.001 inch thick. Electrode supports 14 and 15 are formed of porous, electrically conductive sheet material—typically carbon fiber paper having a Teflon® coating.

The ion exchange membrane 13 has a catalyst layer formed on either side at the membrane-electrode interface so as to promote the desired electrochemical reaction. The anode catalyst 16 and the cathode catalyst 8 are typically chosen from one of the noble metals or noble metal alloys well known in the art, such as platinum or the like. The electrode supports, 14 and 15, are then electrically coupled in order to provide a path for conducting electrons between the electrodes 14 and 15 when an external load is applied.

Still in reference to FIG. 1, fuel is supplied to the anode catalyst 16 through the fuel channels 20 formed within an anode flow field plate 18, while an oxidant is supplied to the oxidant channels 19 within a cathode flow field plate 17. The anode and cathode flow field plates, 18 and 17 respectively, are formed from a porous graphite, a porous graphite-polymer composite or the like. Alternatively, a fuel cell wherein only one of the anode and cathode flow field plates, 18 and 17 respectively, is porous, is also contemplated and may be employed without departing from the broader aspects of the present invention.

The fuel and oxidant together are referred to as reactants. The fuel channels 20 are typically arranged approximately orthogonal to the oxidant channels 19. The fuel channels 20 and oxidant channels 19 may be engraved, milled or molded in the surface of the anode or cathode flow field plates, 18 and 17 respectively, and may be one continuous channel or a plurality of channels. The fuel and oxidant may be fed through the fuel cell stack 10 utilizing an axial feed manifolding, exterior manifolding or a combination of the two—the specific arrangement of manifolding being commonly known to those skilled in the art and not of primary concern with respect to the present invention.

In operation, hydrogen fuel permeates the porous material of the anode electrode support 15, hereinafter referred to as 'anode 15', and reacts at the catalyst layer 16 to form hydrogen ions and electrons. The hydrogen ions migrate through the membrane 13 to the cathode electrode support 14, while the electrons flow through the external load circuit to the cathode electrode support 14, hereinafter referred to as 'cathode 14'. At the cathode 14, the oxidant also permeates through the porous electrode material and reacts with the hydrogen ions and the electrons from the anode 15 at the cathode catalyst 8 to form the by-product water. Not only does the ion exchange membrane 13 allow the migration of these hydrogen ions from the anode catalyst 16 to the cathode catalyst 8, but the ion exchange membrane 13 also acts to isolate the hydrogen fuel flowing through fuel channels 20 from the oxygen-containing gas oxidant as it flows through the oxidant channels 19. A coolant, typically in the form of water, is supplied to the fuel cells 11 and 12 through coolant channels 21 formed in the anode and cathode flow field plates, 18 and 17 respectively, for the purpose of removing excess heat generated by the electrochemical reaction taking place within fuel cells 11 and 12.

While a proton exchange membrane and carbon fiber paper having a Teflon® coating have been described, the present invention is not limited in this regard as other membranes and electrode support materials may be alternatively utilized, providing they allow for the necessary flow of molecules, ions and electrons. Likewise, fuel cells having liquid electrolytes may also be employed without departing from the broader aspects of the present invention.

As shown in FIG. 1, the coolant channels 21 comprise part of a primary thermal management loop, discussed in detail later, and serve to address two main concerns of an operating fuel cell assembly. These two concerns are the water management of a fuel cell assembly, as well as the thermal management of a fuel cell assembly. In a PEM fuel cell assembly, for example the fuel cell assembly 11 as shown in FIG. 1, the PEM 13 must be sufficiently hydrated for the fuel cell assembly 11 to operate and continue to allow the migration of ions across the PEM 13. One manner in which the PEM 13 remains hydrated during operation of the fuel cell assembly 11 is by humidifying both the fuel and oxidant streams flowing within the fuel and oxidant channels, 20 and 19 respectively, by evaporating water from the water transfer plates 17 and 18. In connection with the hydrogen ions migrating across the PEM 13, as discussed previously, a phenomenon called proton drag takes place where the water contained within the humidified fuel channels 20 is dragged through the PEM 13, thereby providing a measured amount of hydration for the PEM 13.

While the proton dragging of water molecules across the PEM 13 dehydrates the PEM 13 and contributes to a build-up of water at the cathode 14 of the fuel cell assembly 11. In addition, the by-product water formed within the fuel cell assembly 11 as a result of the interaction between the oxidant carried in oxidant channels 19 and the hydrogen ions migrating across the PEM 13 also result in a build-up of water at the cathode catalyst 8. The coolant channels 21, however, serve to collect the excess water gathered at the cathode catalyst 8, as well as internally providing water for humidifying both the fuel and oxidant fluids. This water management is accomplished through a balancing of pressures in the oxidant channels 19, coolant channels 21 and fuel channels 20, as well as by the evaporation into the reactant fluids. An oxidant is fed through the oxidant channels 19, and a fuel if fed through the fuel channels 20, both at a pressure slightly higher than the pressure of a coolant being fed through the coolant channels 21. With this arrangement, the excess water molecules at the cathode catalyst 8 of the fuel cell assembly 11 have a natural tendency to diffuse through the porous material of the cathode flow field plate 17 and into the coolant channels 21. Therefore, not only do the coolant channels 21 absorb excess water from the cathode 14 of the fuel cell assembly 11, but they also facilitate the diffusion of water molecules from the coolant channels 21, through the porous anode flow field plate 18, to thereby re-hydrate the fuel in the fuel channels 20 as well as the PEM 13. In this manner, through a judicious balance of the pressures within the oxidant channels 19 and the fuel channels 20, the coolant channels 21 serve to provide an adequate supply of water at the anode 15, insuring the hydration of the PEM 13 and purging any excess water built up at the cathode 14.

Figure 3A:
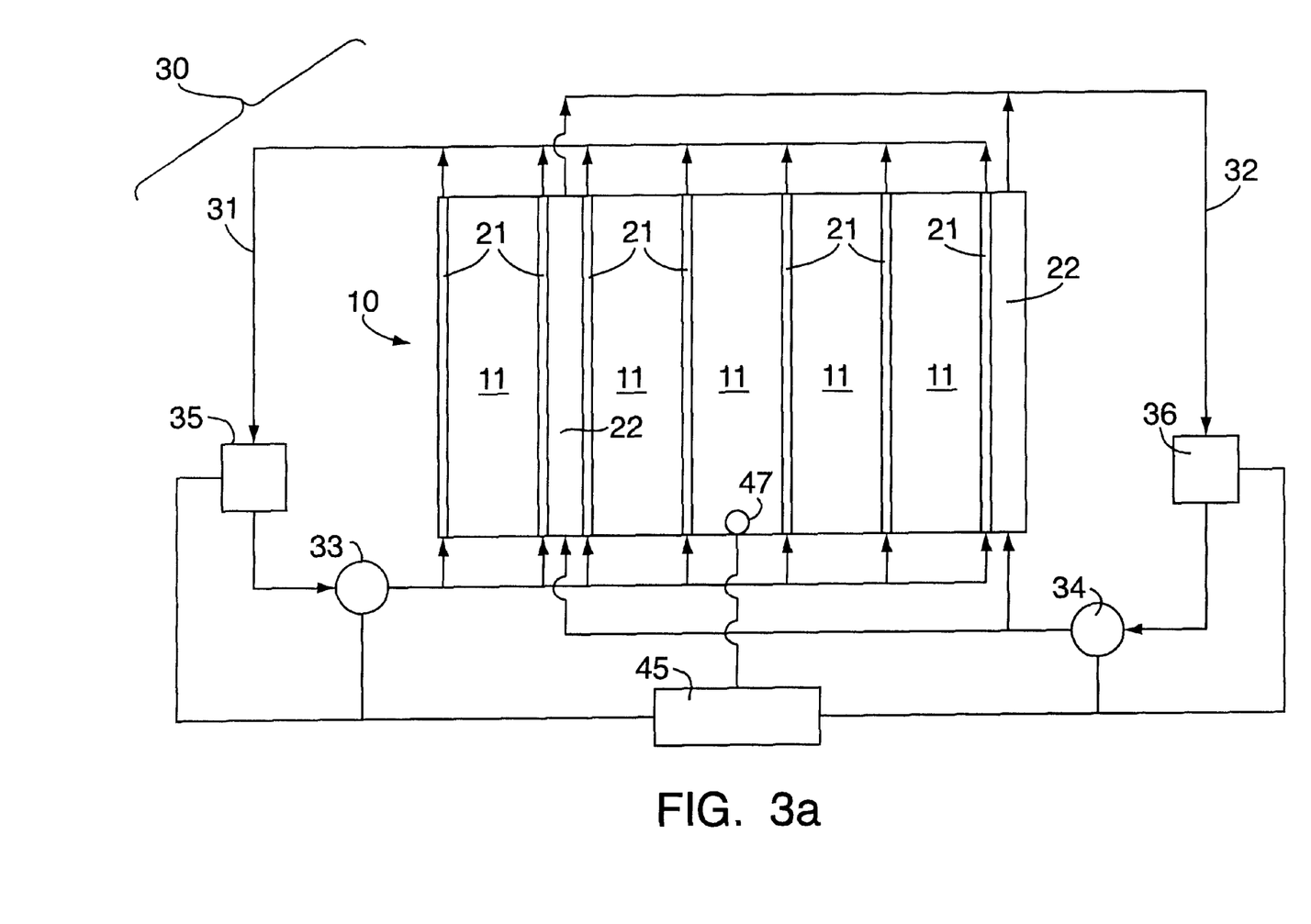
FIG. 3a is a simplified schematic illustration of a thermal management apparatus, according to one embodiment of the present invention.

The coolant channels 21 of the fuel cell assembly 11 shown in FIG. 1 further provide for the thermal management of the fuel cell assembly 11, as well as the fuel cell stack 10 as a whole. By circulating about each fuel cell assembly 11 in a fuel cell stack 10, the water coolant absorbs excess heat generated by the chemical reactions taking place within the fuel cell stack 10. The temperature of the fuel cell stack 10 can, therefore, be controlled by regulating the inlet temperature and flow rate of the coolant through the coolant channels 21, as well as through a process of removing heat from the coolant at a point outside of the fuel cell stack 10, as will be described in more detail later in conjunction with FIG. 3.

While it should be readily apparent that utilizing water as a coolant within a fuel cell stack 10 is beneficial for the purposes of water and thermal management, problems arise when a fuel cell stack 10 so equipped experiences freezing temperatures; that is, temperatures at or below 32° F. (0° C.). When a fuel cell stack 10 experiences temperatures at or below the freezing point of water, the water which is included within the fuel cell stack 10 begins to freeze and expand and may thereby cause injury to either the PEM 13 or other structure within the fuel cell stack 10. Additionally, even if the actual freezing of the fuel cell stack 10 does not cause inoperative damage, a problem still exists in that the start-up time of a frozen fuel cell stack 10 is unduly long. It would therefore be very beneficial to equip a fuel cell stack 10 with an apparatus which may maintain the fuel cell stack 10 above 32° F., or alternatively, quickly raise the temperature of a frozen fuel cell stack 10 so as to rapidly enable operation of the fuel cell stack 10.

It is a major aspect of the present invention, therefore, to provide such a thermal management apparatus for a fuel cell stack 10. Still in reference to FIG. 1, a cooler plate 22 is shown for this purpose. The cooler plate 22 is interspersed throughout the fuel cell stack 10 at locations between individual fuel cell assemblies or groups of fuel cell assemblies. The cooler plate 22 has a plurality of coolant flow channels 23 engraved, milled or molded within the body of the cooler plate 22. These coolant flow channels 23 carry an antifreeze solution capable of remaining liquid at temperatures of at least −40° F., such as a glycol solution, and comprise a portion of a secondary thermal management loop to be described in more detail later in conjunction with FIG. 3. The glycol solution may be ethylene glycol, propylene glycol, methanol, or the like.

The cooler plate 22 is made of a dense impervious material, such as graphite having a polymer binder, but may be metallic as well, and is both thermally and electrically conductive. The cooler plate 22 prohibits diffusion of the coolant antifreeze solution into the rest of fuel cell stack 10. It should be readily appreciated that through regulation of the temperature of the antifreeze solution circulating through coolant flow channels 23, as well as regulating its flow rate, heat will flow from the cooler plate 22 to effect a raising, or the maintaining, of the temperature within the fuel cell stack 10. The cooler plate 22, therefore, is in thermal communication with the fuel cell stack and acts as a heat source from which heat is transferred through a combination of conduction and convection to the surrounding individual fuel cell assemblies.

Figure 2A:
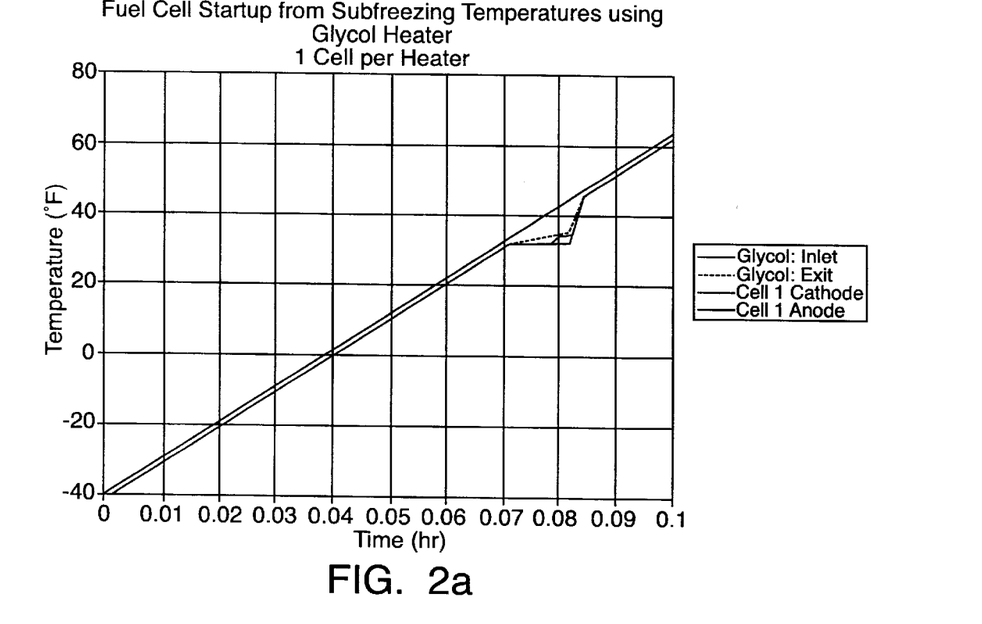
FIGS. 2a–2d are tables representing transient temperature profiles of a cooler plate being interspersed at a plurality of different locations throughout a fuel cell stack.

FIGS. 2a–2d illustrate the transient temperature profiles of components within a fuel cell stack with a cooler plate 22 being interspersed throughout the fuel cell stack, the number of individual fuel cell assemblies between each cooler plate 22 differing. The antifreeze inlet temperature was augmented in each of FIGS. 2a–2d so that the last remaining fuel cell assembly in a particular fuel cell stack would be completely melted after approximately five (5) minutes. In particular, FIG. 2a illustrates the effect of having a cooler plate 22 interspersed between each fuel cell assembly in a fuel cell stack. As can be seen from FIG. 2a, having cooler plates 22 between each fuel cell assembly results in a rapid and mostly linear rise in the temperature of the fuel cell stack; the melting of the last fuel cell assembly achieved with an antifreeze inlet temperature of approximately 45° F.

Figure 2B:
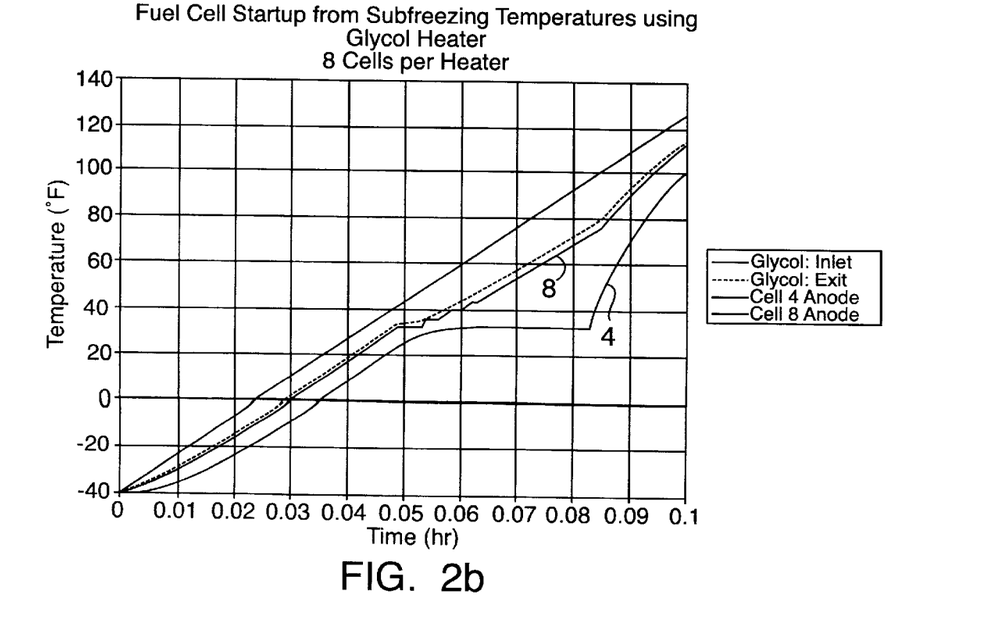
Figure 2C:
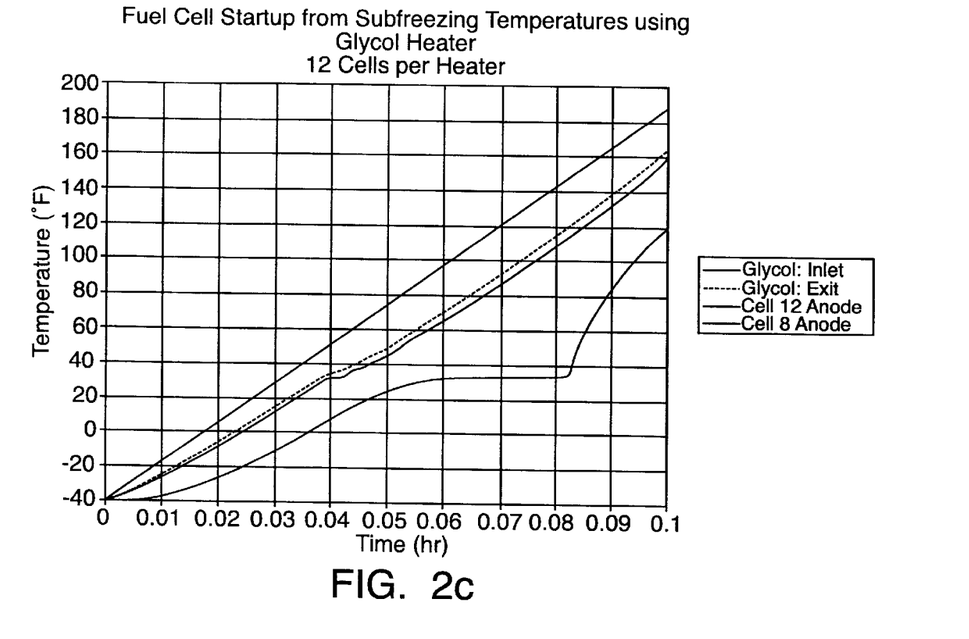
Figure 2D:
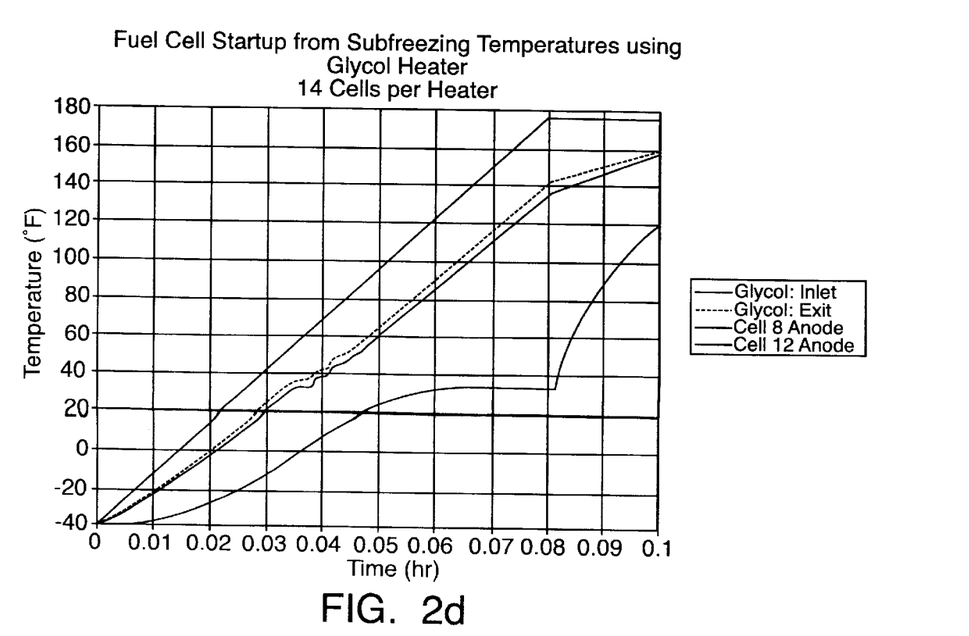

FIG. 2b illustrates the effect of a cooler plate 22 being interspersed every eight (8) fuel cell assemblies in a fuel cell stack. This results in the melting of the last fuel cell assembly at an antifreeze inlet temperature of approximately 100° F. In FIG. 2c a cooler plate 22 is interspersed every twelve (12) fuel cell assemblies, the melting of the last fuel cell assembly requiring an antifreeze inlet temperature of approximately 150° F. Finally, FIG. 2d illustrates a cooler plate 22 being interspersed every fourteen (14) fuel cell assemblies, the melting of the last fuel cell assembly requiring a glycol antifreeze temperature of approximately 176° F.

As can be seen from the foregoing FIGS. 2a–2d, the greater number of fuel cell assemblies interspersed between each cooler plate 22, the greater the antifreeze inlet temperature is required to be to enable melting of the last fuel cell assembly within an approximate five (5) minute time-period. If a cooler plate 22 were to be interspersed at an interval of more than every fourteen (14) fuel cell assemblies, then an inlet glycol antifreeze temperature exceeding 200° F. would be required. At temperatures exceeding 200° F., an inlet glycol antifreeze flow would adversely affect the operation of the fuel cell stack and is not recommended.

According to the present invention, therefore, a cooler plate 22 is preferably interspersed every one (1) to fourteen (14) fuel cell assemblies; ore preferably every four (4) to twelve (12) fuel cell assemblies; and most preferably every four (4) fuel cell assemblies.

FIG. 3a illustrates a thermal management apparatus 30 according to one embodiment of the present invention. The thermal management apparatus 30 includes a partial fuel cell stack 10 having a plurality of individual fuel cell assemblies 11 connected in series. Each fuel cell assembly 11 is equipped with coolant channels 21 for carrying a water coolant about each fuel cell assembly 11. The coolant channels 21 additionally provide for water management within the fuel cell stack 10 in a manner as was described in conjunction with FIG. 1. For illustration purposes, cooler plates 22 are shown interspersed every four (4) fuel cell assemblies 11 for maintaining or raising the temperature of the fuel cell stack 10.

A primary thermal management loop 31 is shown in FIG. 3a for providing regulation to the coolant flow within the fuel cell stack 10. The primary thermal management loop 31 is in thermal communication with the fuel cell stack 10 and utilizes a primary thermal management pump 33 for supplying the fuel cell stack 10 with a supply of water coolant to the coolant channels 21. The coolant in the primary loop is typically at a negative pressure to ambient. As the water coolant passes through the fuel cell stack 10, the water coolant absorbs a portion of the heat generated by the chemical reactions taking place within the fuel cell stack 10. This absorption occurs as a result of a combination of conduction and convection from the heated fuel cell assemblies to the coolant in the coolant channels 21. These heated coolant flows are then exhausted from the fuel cell stack 10.

A primary heat exchanger 35 is situated within the primary thermal management loop 31 for receipt of the heated coolant flows as they exit the fuel cell stack 10. Heat is extracted from the heated coolant flows by the primary heat exchanger 35, through a known process, and is directed back through the primary thermal management pump 33 for subsequent resupply to the fuel cell stack 10. In this manner, the operating temperature of the fuel cell stack 10, as well as the hydration of the PEM 13 within each fuel cell assembly 11, can be regulated so as to ensure optimal performance of the fuel cell stack 10.

Similarly, a secondary thermal management loop 32 also services the fuel cell stack 10, providing regulation to the antifreeze solution flowing through each of the cooler plates 22. The secondary thermal management loop 32 is in thermal communication with the fuel cell stack 10 and utilizes a secondary thermal management pump 34 for supplying the fuel cell stack 10 with a supply of an antifreeze solution to the coolant flow channels 23 contained in the non-porous cooler plates 22. As the antifreeze solution passes through the fuel cell stack 10, the antifreeze solution will transfer a portion of its heat to the fuel cell assemblies 11, after which the antifreeze flows are exhausted from the fuel cell stack 10.

A secondary heat exchanger 36 is situated within the secondary thermal management loop 32 for receipt of the antifreeze flows as they exit the fuel cell stack 10. Heat is added to the antifreeze flows by the secondary heat exchanger 36, using an electric or fossil fuel heating source, and is directed back through the secondary thermal management pump 34 for subsequent recirculation to the cooler plates 22. In this manner, the temperature of the fuel cell stack 10 may be maintained or raised above freezing, as the situation warrants.

It should be noted that the coolant flow channels 23 are diffusably isolated, by the material of the cooler plates 22, from the rest of the fuel cell stack 10, including the coolant channels 21. This isolation ensures that neither the coolant nor any reactant flows will contaminate or be contaminated by the antifreeze solution in the coolant channels 21.

FIG. 3a also shows a thermal management loop controller 45, which may be a computer, for controlling both the primary and secondary thermal management loops 31 and 32, respectively. The thermal management loop controller 45 regulates the primary heat exchanger 35 and primary thermal management pump 33 according to a predetermined set of parameters to effect water management of the fuel cell assemblies 11, as well as ensuring that the fuel cell stack 10 is not overheated.

In conjunction with these concerns, the thermal management loop controller 45 also regulates the secondary heat exchanger 36 and secondary thermal management pump 34. In regulating the secondary thermal management loop 32, the thermal management controller 45 accepts temperature data from a temperature sensor 47 at a point, or points, within the fuel cell stack 10. Thus, the thermal management controller 45 ensures that the fuel cell stack 10 does not fall below freezing or, alternatively, may be activated at a time after the fuel cell stack 10 has fallen below freezing to quickly bring the fuel cell stack 10 up above freezing, as would also be detected by the temperature sensor 47.

Figure 3B:
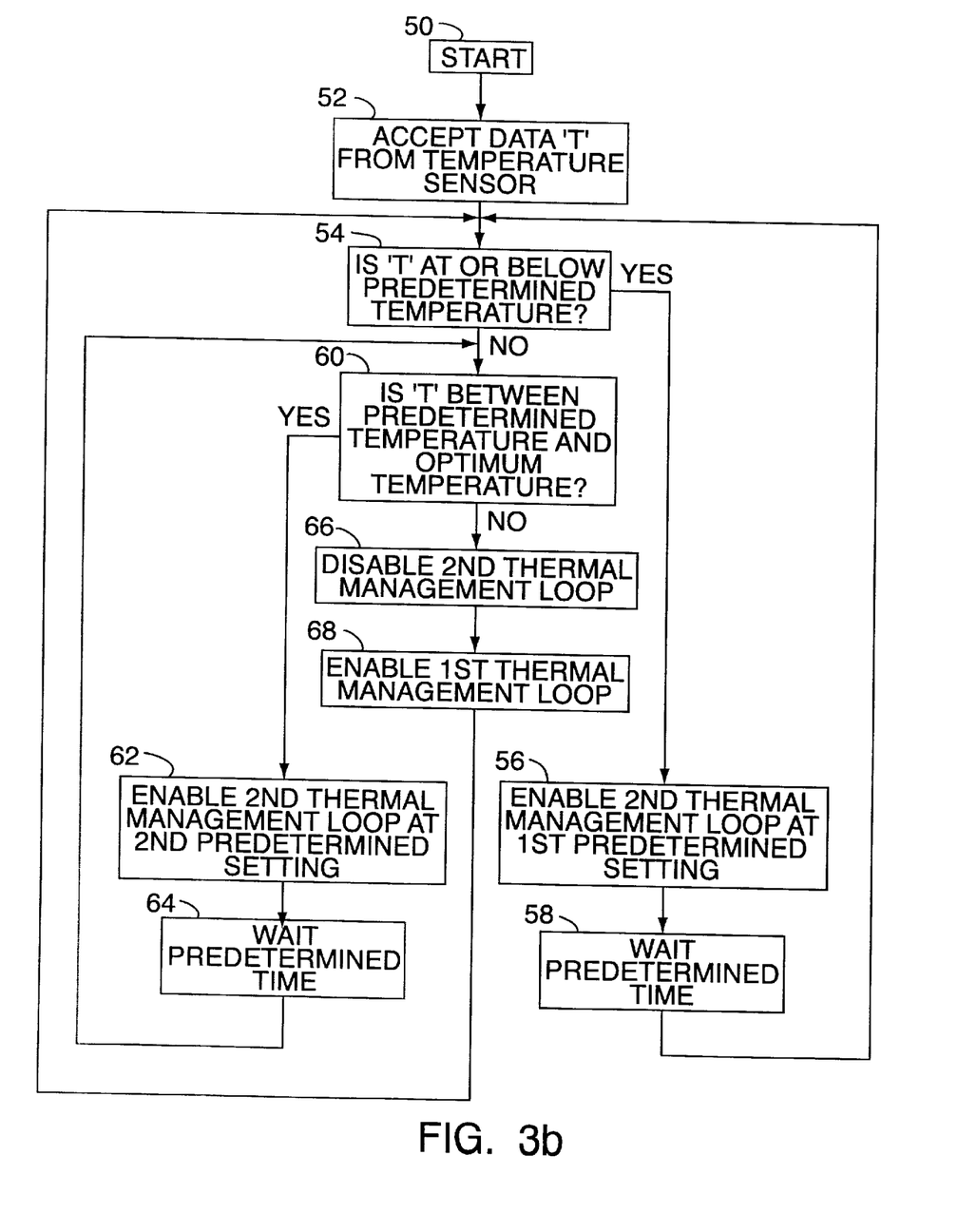
FIG. 3b is a flow diagram of a thermal management controller, according to one embodiment of the present invention.

FIG. 3b is a flow diagram of the thermal management controller 45 according to a preferred embodiment of the present invention. At block 50 the thermal management controller 45 is supplied with power and is activated. The thermal management controller 45 then proceeds to block 52 where temperature data 'T' from the temperature sensor 47 is accepted. In block 54 the thermal management controller 45 compares the detected temperature 'T' to determine whether 'T' is at or below a predetermined temperature, such as freezing or 32° F. (0° C.).

If it is determined at block 54 that 'T' is at or below the predetermined temperature, then the thermal management controller 45 proceeds to block 56 and enables the secondary thermal management loop 32, including the secondary heat exchanger 36 and secondary thermal management pump 34. The secondary heat exchanger 36 is controlled to heat up the antifreeze solution within the secondary thermal management loop 32 to a first predetermined setting. The first predetermined setting is a temperature which corresponds to the transient temperature profiles seen in FIGS. 2a–2d, so that the antifreeze will be heated to a temperature in relation to the spacing of the cooler plates 22 within the fuel cell stack.

Block 58 of FIG. 3b illustrates the thermal management controller 45 waiting a predetermined length of time before comparing, once again, the predetermined temperature with the temperature detected by the temperature sensor 47. The predetermined length of time is set according to the temperature of the heated antifreeze and corresponds to the anticipated time needed to raise the temperature of the fuel cell stack above that of the predetermined temperature. If based upon the transient temperature profiles of FIGS. 2a–2d, a waiting time of approximately five (5) minutes would be set. According to the present embodiment, the thermal management controller 45 continues to heat the antifreeze solution and compare the temperature of the fuel cell stack until the fuel cell stack rises above the predetermined temperature, thereby rapidly raising the fuel cell stack above freezing.

Once the temperature of the fuel cell stack rises above the predetermined temperature, or if the fuel cell stack was originally detected to be above the predetermined temperature, block 60 then compares the temperature of the fuel cell stack to determine if its temperature is between the predetermined temperature and an optimum operating temperature of the fuel cell stack. It will be readily appreciated that the optimum operating temperature of a particular fuel cell stack would depend on the specific type of fuel cell stack utilized. The present invention is not limited in this regard as any particular optimal temperature, or range of temperatures, may be utilized.

If the answer at block 60 is 'yes', the fuel cell stack is operating at a temperature above freezing, yet not at its optimum operating temperature. When start-up is initiated, block 62 then enables the secondary thermal management loop 32, including the secondary heat exchanger 36 and secondary thermal management pump 34. The secondary heat exchanger 36 is controlled to heat up the antifreeze solution within the secondary thermal management loop 32 to a second predetermined setting. The second predetermined setting is a temperature which is not as high as that of the first predetermined temperature, but sufficient to raise the temperature of the fuel cell stack to its optimum operating temperature.

Block 64 of FIG. 3b illustrates the thermal management controller 45 waiting a predetermined length of time before comparing, once again, the predetermined temperature with the temperature detected by the temperature sensor 47. The predetermined length of time is set to the same time period as was set in block 58, as noted previously. According to the present embodiment, therefore, the thermal management controller 45 continues to heat the antifreeze solution and compares the temperature of the fuel cell stack until the fuel cell stack rises above the optimum operating temperature, thereby assuredly maintaining the fuel cell stack above freezing.

When the fuel cell stack has a detected temperature above that of the predetermined temperature as well as the optimum operating temperature, block 66 disables the secondary thermal management loop 32. In this case, the danger to the fuel cell stack is no longer freezing temperatures, but harmful high temperatures. The thermal management controller 45 then proceeds to block 68 where the primary thermal management loop 31 is enabled so as to provide efficient water and heat management of the fuel cell stack in a manner as discussed previously.

As FIG. 3b further shows, the thermal management controller 45 returns to continually monitor the temperature of the fuel cell stack and can effectively provide for enablement of the primary and secondary thermal management loops, 31 and 32, respectively.

The present invention, therefore, provides for a dual thermal management loop apparatus 30 having two thermal management loops, 31 and 32. Each of the thermal management loops, 31 and 32, being in thermal communication with one another and the fuel cell stack 10, yet independently self contained and not in diffusable communication. Indeed, the secondary thermal management loop 32 is not in diffusable communication with any part of the fuel cell stack 10.

Moreover, the present invention advantageously allows for incorporation of the cooler plates 22 in a fuel cell stack which includes individual fuel cell assemblies having both porous anode and porous cathode flow field plates, as well as those fuel cell stacks which include individual fuel cell assemblies having only one porous anode and cathode flow field plate.

Additionally, the cooler plates 22 of the present invention are advantageously formed as separate structural units which are diffusably isolated from the individual fuel cell assemblies of the fuel cell stack. In this manner, the cooler plates 22 may be interspersed at any location along the length of a fuel cell stack, regardless of the type of fuel cell utilized, without fear of cross-contamination between the antifreeze solution and the reactant flows.

It should be readily apparent that while a fuel cell stack 10 has been described, the present invention is not limited in this regard as other fuel cell arrangements, such as a cascade flow arrangement, may be utilized without departing from the broader aspects of the present invention. In addition, the temperature of the fuel cell stack 10 may be determined by a single temperature sensor 47, or by another alternative method, such as by averaging a plurality of spaced temperature sensors, or by determining the temperature of the coolant flows as they enter either the primary heat exchanger 35 or primary thermal management pump 33.

In addition, the present invention may be alternatively utilized to maintain a fuel cell stack at any desired temperature, such as when the fuel cell stack is in a stand-by mode or the like.

While the invention had been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A thermal management apparatus for a fuel cell stack having a plurality of thermal management loops, said apparatus comprising:

a primary thermal management loop in thermal communication with said fuel cell stack;

a secondary thermal management loop in thermal communication with said fuel cell stack for circulating an antifreeze solution, said primary thermal management loop and said secondary thermal management loop being diffusably isolated from one another;

a temperature sensor generating data corresponding to a temperature within said fuel cell stack;

a heat exchanger which heats said circulating antifreeze solution; and a thermal management loop controller for activating said heat exchanger when said data indicates that a temperature within said fuel cell stack is at or below 32° F.

2. The thermal management apparatus for a fuel cell stack having a plurality of thermal management loops according to claim 1, wherein:

said primary thermal management loop circulates a coolant and is in diffusable communication with said fuel cell stack.

3. The thermal management apparatus for a fuel cell stack having a plurality of thermal management loops according to claim 2, wherein:
    said thermal management apparatus further includes a cooler plate adapted to circulate only said antifreeze solution.

4. The thermal management apparatus for a fuel cell stack having a plurality of thermal management loops in contact thereof according to claim 2, wherein:
    said fuel cell stack includes a plurality of electrically connected fuel cell assemblies;
    said primary thermal management loop circulates said coolant about each of said fuel cell assemblies in said fuel cell stack; and
    said secondary thermal management loop circulates said antifreeze solution at interspersed locations between said fuel cell assemblies along said fuel cell stack.

5. The thermal management apparatus for a fuel cell stack having a plurality of thermal management loops according to claim 4, wherein:
    said fuel cell assemblies include porous anode and porous cathode flow field plates.

6. The thermal management apparatus for a fuel cell stack having a plurality of thermal management loops according to claim 4, wherein:
    said locations are interspersed every 4 to 12 of said fuel cell assemblies.

7. The thermal management apparatus for a fuel cell stack having a plurality of thermal management loops according to claim 1, wherein:
    said heat exchanger is capable of heating said antifreeze solution to approximately 200° F.; and
    said antifreeze solution comprises a liquid which remains fluid at least until a temperature of approximately −40° F.

8. The thermal management apparatus for a fuel cell stack having a plurality of thermal management loops according to claim 7, wherein:
    said thermal management loop controller activates said heat exchanger so as to maintain a temperature within said fuel cell stack above 32° F.

9. A thermal management apparatus for a fuel cell stack including a plurality of electrochemical fuel cell assemblies being in electrical connection with each other, said fuel cell assemblies each having a water permeable membrane, an anode and a cathode, said apparatus comprising:
    a primary thermal management loop having a coolant flow channel in thermal communication with said fuel cell assemblies, said coolant flow channel circulating a coolant about each of said fuel cell assemblies;
    a secondary thermal management loop circulating an antifreeze solution through an antifreeze flow channel spaced at interspersed locations between said fuel cell assemblies along said fuel cell stack;
    a heat exchanger in thermal communication with said secondary thermal management loop;
    a temperature sensor generating data corresponding to a temperature within said fuel cell stack; and
    a thermal management loop controller which accepts data from said temperature sensor and regulates said heat exchanger so as to maintain said temperature within said fuel cell stack above 32° F.

10. The thermal management apparatus for a fuel cell stack including a plurality of electrochemical fuel cell assemblies being in electrical connection with each other, said fuel cell assemblies each having a water permeable membrane, an anode and a cathode according to claim 9, wherein:
    said primary thermal management loop and said secondary thermal management loop are diffusably isolated from one another; and
    said secondary thermal management loop is diffusably isolated from said fuel cell stack.

11. The thermal management apparatus for a fuel cell stack including a plurality of electrochemical fuel cell assemblies being in electrical connection with each other, said fuel cell assemblies each having a water permeable membrane, an anode and a cathode according to claim 10, wherein:
    said locations are interspersed every 4 to 12 of said fuel cell assemblies.

12. The thermal management apparatus for a fuel cell stack including a plurality of electrochemical fuel cell assemblies being in electrical connection with each other, said fuel cell assemblies each having a water permeable membrane, an anode and a cathode according to claim 11, wherein:
    said antifreeze solution comprises a liquid which remains fluid at least until a temperature of approximately −40° F.

13. The thermal management apparatus for a fuel cell stack including a plurality of electrochemical fuel cell assemblies being in electrical connection with each other, said fuel cell assemblies each having a water permeable membrane, an anode and a cathode according to claim 12, wherein:
    said thermal management loop controller activates said heat exchanger when said data indicates that a temperature within said fuel cell stack is at or below 32° F.

14. The thermal management apparatus for a fuel cell stack having a plurality of thermal management loops according to claim 9, wherein:
    said thermal management apparatus further includes a cooler plate adapted to circulate only said antifreeze solution.

15. The thermal management apparatus for a fuel cell stack having a plurality of thermal management loops according to claim 9, wherein:
    said fuel cell assemblies include porous anode and porous cathode flow field plates.

16. A thermal management apparatus for a fuel cell assembly having a plurality of thermal management loops, said apparatus comprising:
    a primary thermal management loop having a coolant flow channel in thermal communication with said fuel cell assembly, said coolant flow channel circulating a coolant about said fuel cell assembly;
    a secondary thermal management loop in thermal communication with said fuel cell assembly, said secondary thermal management loop circulating an antifreeze solution through an antifreeze flow channel;
    a heat exchanger in thermal communication with said secondary thermal management loop;
    a temperature sensor generating data corresponding to a temperature within said fuel cell assembly; and
    a thermal management loop controller which accepts data from said temperature sensor and activates said heat exchanger when said data indicates that a temperature within said fuel cell assembly is at or below 32° F.

17. The thermal management apparatus for a fuel cell assembly having a plurality of thermal management loops in contact thereof according to claim 16, wherein:

said primary thermal management loop and said secondary thermal management loop are diffusably isolated from one another; and said secondary thermal management loop is diffusably isolated from said fuel cell assembly.

18. The thermal management apparatus for a fuel cell assembly having a plurality of thermal management loops in contact thereof according to claim 17, wherein:

said heat exchanger is capable of heating said circulating antifreeze solution to approximately 200° F.; and said antifreeze solution comprises a liquid which remains fluid at least until a temperature of approximately −40° F.

19. The thermal management apparatus for a fuel cell assembly having a plurality of thermal management loops in contact thereof according to claim 18, wherein:

said thermal management loop controller activates said heat exchanger so as to maintain a temperature within said fuel cell assembly above 32° F.

20. The thermal management apparatus for a fuel cell stack having a plurality of thermal management loops according to claim 16, wherein:

said thermal management apparatus further includes a cooler plate adapted to circulate only said antifreeze solution.

21. The thermal management apparatus for a fuel cell stack having a plurality of thermal management loops according to claim 16, wherein:

said fuel cell assembly includes porous anode and porous cathode flow field plates.

22. A method of thermally managing a fuel cell stack having a cooler plate and a plurality of electrically connected fuel cell assemblies, said method comprising the steps of:

circulating a coolant flow about each of said fuel cell assemblies in said fuel cell stack;

circulating an antifreeze solution flow between said fuel cell assemblies at enabling a thermal management loop; interspersed locations along said fuel cell stack;

heating said antifreeze solution to maintain said fuel cell stack above 32° F.; and adapting said cooler plate to circulate only said antifreeze solution.

23. A method of thermally managing a fuel cell stack having a plurality of electrically connected fuel cell assemblies according to claim 22, said method further comprising the steps of:

ensuring that said coolant flow and said antifreeze solution flow are diffusably isolated from one another while in thermal communication with one another and said fuel cell stack.

24. A method of thermally managing a fuel cell stack having a plurality of electrically connected fuel cell assemblies according to claim 23, said method further comprising the steps of:

detecting a temperature of said fuel cell stack; and controlling said coolant flow and said antifreeze solution flow in accordance with said detected temperature.

25. A method of thermally managing a fuel cell stack having a plurality of electrically connected fuel cell assemblies according to claim 24, said method further comprising the steps of:

activating said heating of said antifreeze solution when said detected temperature is at or below 32° F.

26. A method of thermally managing a fuel cell stack having a plurality of thermal management loops in contact thereof, said method comprising the steps of:

enabling a thermal management controller;

communicating a temperature of said fuel cell stack to said thermal management controller;

determining if said communicated temperature is at or below a predetermined temperature;

enabling a primary thermal management loop and a secondary thermal management loop if said communicated temperature is at or below a predetermined temperature;

circulating an antifreeze solution within said secondary thermal loop, said antifreeze solution being heated to a first predetermined setting;

waiting a predetermined time; and determining if said communicated temperature is still at or below a predetermined temperature.

27. The method of thermally managing a fuel cell stack having a plurality of thermal management loops in contact thereof according to claim 26, said method further comprising the steps of:

determining if said communicated temperature is between said predetermined temperature and an optimum temperature;

enabling said secondary thermal management loop if said communicated temperature is between said predetermined temperature and said optimum temperature;

circulating said antifreeze solution within said secondary thermal loop, said antifreeze solution being heated to a second predetermined setting lower than said first predetermined setting;

waiting said predetermined time; and determining if said communicated temperature is still between said predetermined temperature and said optimum temperature.

28. The method of thermally managing a fuel cell stack having a plurality of thermal management loops in contact thereof according to claim 27, said method further comprising the steps of:

determining if said communicated temperature is above said optimum temperature;

disabling said secondary thermal management loop if said communicated temperature is above said optimum temperature;

enabling a first thermal management loop, said first thermal management loop circulating a coolant; and determining if said communicated temperature is still above said optimum temperature.

* * * * *